United States Patent
Yang et al.

(10) Patent No.: US 11,304,250 B2
(45) Date of Patent: Apr. 12, 2022

(54) INTERFERENCE PROCESSING METHOD, TERMINAL DEVICE, NETWORK DEVICE, AND COMPUTER STORAGE MEDIUM

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 73 days.

(21) Appl. No.: 16/754,225

(22) PCT Filed: Oct. 13, 2017

(86) PCT No.: PCT/CN2017/106063
§ 371 (c)(1),
(2) Date: Apr. 7, 2020

(87) PCT Pub. No.: WO2019/071573
PCT Pub. Date: Apr. 18, 2019

(65) Prior Publication Data
US 2020/0275503 A1 Aug. 27, 2020

(51) Int. Cl.
*H04W 76/15* (2018.01)
*H04W 76/11* (2018.01)
(Continued)

(52) U.S. Cl.
CPC ....... *H04W 76/15* (2018.02); *H04W 72/0453* (2013.01); *H04W 72/082* (2013.01); *H04W 72/1257* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 9,974,092 B2 | 5/2018 | Jang et al. | |
| 2009/0262785 A1 | 10/2009 | Wilhelmsson | |

(Continued)

FOREIGN PATENT DOCUMENTS

| | | |
|---|---|---|
| CN | 103155448 A | 6/2013 |
| CN | 103369686 A | 10/2013 |

(Continued)

OTHER PUBLICATIONS

First Office Action of the European application No. 17928719.8, dated Mar. 19, 2021.

(Continued)

*Primary Examiner* — Mohammad S Adhami

(57) ABSTRACT

Disclosed are an interference processing method, a terminal device, a network device, and a computer storage medium. The method comprises: when a terminal device is in a dual-connection mode, detecting the internal interference level when at least one sub-band on a carrier of a first cell and a second cell transmit and receive data at the same time, wherein in the dual-connection mode, the terminal device can establish a connection with the first cell and the second cell; according to the internal interference level when the sub-band and the second cell transmit and receive data at the same time, determining the usage priority of the sub-band; and reporting the sub-band and the corresponding internal interference level and usage priority to a network side, wherein the internal interference level comprises at least one of the following: whether an internal interference indication and an internal interference grade exist.

20 Claims, 2 Drawing Sheets

---

When a terminal device is in a dual-connectivity mode, detecting an internal interference level during simultaneous data transmission and reception through at least one sub-band on a carrier of a first cell and a second cell — 101

Determining a usage priority of the sub-band is determined according to the internal interference level during simultaneous data transmission and reception through the sub-band and the second cell — 102

Reporting the sub-band and the corresponding internal interference level and usage priority to a network side — 103

(51) Int. Cl.
*H04W 72/04* (2009.01)
*H04W 72/08* (2009.01)
*H04W 72/12* (2009.01)

(56) References Cited

U.S. PATENT DOCUMENTS

| | | | |
|---|---|---|---|
| 2012/0087341 A1 | 4/2012 | Jang et al. | |
| 2013/0337821 A1* | 12/2013 | Clegg | H04W 24/08 455/452.1 |
| 2015/0215947 A1 | 7/2015 | Kaukovouri et al. | |
| 2015/0327280 A1* | 11/2015 | Zhang | H04W 76/20 370/280 |
| 2018/0124687 A1* | 5/2018 | Park | H04L 5/1469 |
| 2019/0327057 A1* | 10/2019 | Wu | H04L 5/0048 |

FOREIGN PATENT DOCUMENTS

| | | |
|---|---|---|
| CN | 103391583 A | 11/2013 |
| CN | 103444100 A | 12/2013 |
| CN | 103874216 A | 6/2014 |
| CN | 103906071 A | 7/2014 |
| CN | 104756578 A | 7/2015 |
| CN | 105307178 A | 2/2016 |
| CN | 105430748 A | 3/2016 |
| JP | 2016516334 A | 6/2016 |
| JP | 2017517935 A | 6/2017 |

OTHER PUBLICATIONS

First Office Action of the Chinese application No. 202010455948.1, dated May 27, 2021.

NTT Docomo, Inc. (Email discussion rapporteur); "Summary of email discussion [93bis#23][NR] Deployment scenarios", 3GPP TSG-RAN WG2 #94, R2-164306, May 23-27, 2016, entire document.

International Search Report in the international application No. PCT/CN2017/106063, dated Jul. 4, 2018.

Mediatek Inc: "TP for TR 37.863-01-01 self-interference analysis for DC 26A n77" 3GPP Draft: R4-1710895, 3rd Generation Partnership Project (3GPP), vol. RAN WG4, no. Dubrovnik, Croatia; Oct. 9, 2017-Oct. 13, 2017, Oct. 8, 2017 (Oct. 8, 2017), XP051345670, Retrieved from the Internet: URL: http://www.3gpp.org/ftp/Meetings_3GPP_SYNC/RAN4/Docs/[ retrieved on Oct. 8, 2017]* Self-interference analysis; p. 2, paragraph 6.21.6*.

ZTE et al.: "Handling of harmonics related interference" 3GPP Draft: R1-1716339 Handling of Harmonics Related Interference, 3rd Generation Partnership Project (3GPP), vol. RAN WG1, no. Nagoya, Japan. Sep. 18, 2017-Sep. 21, 2017, Sep. 17, 2017 (Sep. 17, 2017), XP051339794, *Harmonics interference from low frequency UL to high frequency DL; p. 1, paragraph 2.1 -p. 3*.

Guangdong Oppo Mobile Telecom: "Discussion on the scheduling based solution for the NR-LTE self-interference", 3GPP Draft; R1-1715704, 3rd Generation Partnership Project (3GPP), vol. RAN WG1, no. Nagoya, Japan; Sep. 18, 2017-Sep. 21, 2017, Sep. 17, 2017 (Sep. 17, 2017), XP051339166, * Scheduling based solutions for the harmonic related self-interference; p. 2, paragraph 2-p. 4 *.

Supplementary European Search Report in the European application No. 17928719.8, dated Jun. 18, 2020.

English translation of the Written Opinion of the International Search Authority in the international application No. PCT/CN2017/106063, dated Jul. 4, 2018.

First Office Action of the Indian application No. 202017018604, issued on Jun. 12, 2021.

Second Office Action of the Chinese application No. 202010455948.1, issued on Aug. 18, 2021.

First Office Action of the Japanese application No. 2020-519343, issued on Aug. 31, 2021.

* cited by examiner

INTERFERENCE PROCESSING METHOD, TERMINAL DEVICE, NETWORK DEVICE, AND COMPUTER STORAGE MEDIUM

TECHNICAL FIELD

The disclosure relates to the technical field of information processing, and particularly, to a method for interference processing, a terminal device, a network device and a computer storage medium.

BACKGROUND

At present, with pursuit of people for rate, delay, high-speed mobility and efficiency and diversification and complication of services in the future life, the international standard organization 3rd Generation Partnership Project (3GPP) has started researching and developing 5th-Generation (5G). During early deployment of New Radio (NR), it is difficult to implement complete NR coverage, and thus typical network coverage includes wide area Long Term Evolution (LTE) coverage and an NR island coverage mode. Moreover, LTE is mostly deployed below 6 GHz and there are few spectrums for 5G below 6 GHz, so researches on application of spectrums above 6 GHz for NR are required. However, a high frequency band is limited in coverage and fast in signal fading. Meanwhile, for protecting early LTE investment of mobile operating companies, a working mode of tight interworking between LTE and NR is proposed.

For supporting LTE-NR interworking in 5G, when a terminal simultaneously operates at two or more carriers in different frequency bands, uplink signals of these carriers may interfere with downlink received signals of some carriers.

SUMMARY

For solving the technical problem, embodiments of the disclosure provide a method for interference processing, a terminal device, a network device and a computer storage medium.

The embodiments of the disclosure provide a method for interference processing, which may be applied to a terminal device and include the following operations.

When the terminal device is in a dual-connectivity mode, an internal interference level during simultaneous data transmission and reception through at least one sub-band on a carrier of a first cell and a second cell is detected, the terminal device in the dual-connectivity mode being capable of establishing connections with the first cell and the second cell.

A usage priority of the sub-band is determined according to the internal interference level during simultaneous data transmission and reception through the sub-band and the second cell.

The sub-band and the corresponding internal interference level and usage priority are reported to a network side, the internal interference level including at least one of an indication about whether internal interference exists or an interval interference grade.

The embodiments of the disclosure provide an interference processing method, which may be applied to a first network device and include the following operations.

When a terminal device is in a dual-connectivity mode, internal interference level information during simultaneous data reception through at least one sub-band corresponding to a first cell and a second cell and a usage priority corresponding to the sub-band, which are reported by the terminal device, are acquired, the terminal device in the dual-connectivity mode being capable of establishing connections with the first cell and the second cell.

A sub-band to be used is specified for the terminal device based on the internal interference level information during simultaneous data reception through the at least one sub-band and the second cell and the usage priority corresponding to the sub-band.

The embodiments of the disclosure also provide a terminal device, which may include a first processing unit and a first communication unit.

The first processing unit, when the terminal device is in a dual-connectivity mode, may detect an internal interference level during simultaneous data transmission and reception through at least one sub-band on a carrier of a first cell and a second cell and determine a usage priority of the sub-band according to the internal interference level during simultaneous data transmission and reception through the sub-band and the second cell, the terminal device in the dual-connectivity mode being capable of establishing connections with the first cell and the second cell.

The first communication unit may report the sub-band and the corresponding internal interference level and usage priority to a network side, the internal interference level including at least one of an indication about whether internal interference exists or an interval interference grade.

The embodiments of the disclosure also provide a first network device, which may include a second communication unit and a second processing unit.

The second communication unit, when a terminal device is in a dual-connectivity mode, may acquire internal interference level information during simultaneous data reception through at least one sub-band corresponding to a first cell and a second cell and a usage priority corresponding to the sub-band, which are reported by the terminal device, the terminal device in the dual-connectivity mode being capable of establishing connections with the first cell and the second cell.

The second processing unit may specify a sub-band to be used for the terminal device based on the internal interference level information during simultaneous data reception through the at least one sub-band and the second cell and the usage priority corresponding to the sub-band.

The embodiments of the disclosure also provide a terminal device, which may include a processor and a memory configured to store a computer program which is executable on the processor.

The processor may be configured to run the computer program to execute the steps of the abovementioned method.

The embodiments of the disclosure also provide a first network device, which may include a processor and a memory configured to store a computer program which is executable on the processor.

The processor may be configured to run the computer program to execute the steps of the abovementioned method.

The embodiments of the disclosure also provide a computer storage medium, which may store a computer-executable instruction, that when being executed, implement the steps of the abovementioned method.

According to the technical solutions of the embodiments of the disclosure, the terminal device in the dual-connectivity mode reports the corresponding internal interference level during simultaneous data transmission and reception in the first cell and the second cell and usage priority information of a certain spectrum for the terminal device to the network side, and the network side may further select a proper sub-band for the terminal device with reference to the information reported by the terminal device during dynamic sub-band allocation. Therefore, effects of avoiding self-interference in a scenario that data is simultaneously transmitted and received in two cells and improving data demodulation performance can be achieved, and data transmission reliability and throughput may further be improved.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

First Embodiment

Figure 1:
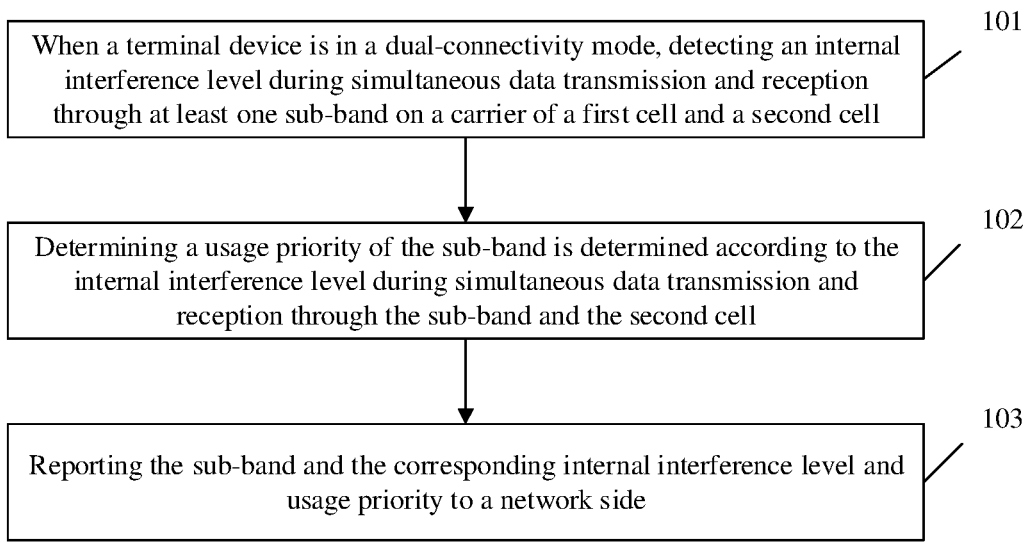
FIG. 1 is a first flowchart of a method for interference processing according to an embodiment of the disclosure.

The embodiment of the disclosure provides a method for interference processing, which is applied to a terminal device and, as shown in FIG. 1, includes the following steps.

At 101, when the terminal device is in a dual-connectivity mode, an internal interference level during simultaneous data transmission and reception through at least one sub-band on a carrier of a first cell and a second cell is detected, the terminal device in the dual-connectivity mode being capable of establishing connections with the first cell and the second cell.

At 102, a usage priority of the sub-band is determined according to the internal interference level during simultaneous data transmission and reception through the sub-band and the second cell.

At 103, the sub-band and the corresponding internal interference level and usage priority are reported to a network side, the internal interference level including at least one of an indication about whether internal interference exists or an interval interference grade.

The terminal device of the embodiment of the disclosure may be a mobile terminal capable of implementing dual connectivity, and for example, may be a device like a smart phone, User Equipment (UE), a tablet computer, etc. Exhaustions are omitted herein.

The dual-connectivity mode may refer to that the terminal device, for example, UE, is configured by the network side to enter an Evolved Universal Terrestrial Radio Access (E-UTRA) NR Dual Connectivity (DC) (EN-DC) mode. The EN-DC mode may refer to that the terminal device implements dual connectivity with an LTE cell and an NR cell.

The first cell may be an NR cell, and the second cell may be an LTE cell.

Furthermore, simultaneous data transmission and reception in the first cell and the second cell may refer to that data is sent in the first cell (the NR cell) and data is simultaneously received in the second cell (the LTE cell).

The operation in 101 that the internal interference level during simultaneous data transmission and reception in the at least one sub-band on the carrier of the first cell and the second cell is detected may refer to that the terminal device detects an interference condition for a band corresponding to the second cell during data transmission in the first cell. The internal interference level includes at least one of the indication about whether the internal interference exists or not and the interval interference grade. That is, the internal interference indication about whether interference exists in each sub-band of the at least one sub-band in the first cell or not may be indicated.

For whether the interference exists or not, there may exist the condition that the interference exists in the sub-band, no interference exists or relatively weak interference exists. Existence of the relatively weak interference refers to a condition that an interference value is less than a preset interference threshold value, and the preset interference threshold value may be set according to a practical condition. Of course, the relatively weak interference may also refer to a condition that a signal-to-noise ratio is less than a preset threshold value or a condition that signal strength is greater than a preset threshold value. Exhaustions are omitted herein.

In addition, the internal interference level may also be represented as the internal interference grade. For example, an internal interference grade of a sub-band where no interference exists may be 0, and an internal interference level of a sub-band where interference exists (i.e., a sub-band of which a signal-to-noise ratio is less than a minimum signal-to-noise ratio threshold value or an interference value is greater than a maximum interference threshold value) may be set to be 5. Then, an internal interference grade corresponding to another interference value may also be set according to another grade threshold value.

For determination of the usage priority of the sub-band, the usage priority of the sub-band may be determined according to the internal interference level during simultaneous data transmission and reception through the sub-band and the second cell, as shown in 102. It may be set by the terminal device according to a practical requirement. For example, a relatively high priority may be set for a sub-band with a relatively low interference value (i.e., relatively low internal interference level), or a relatively high priority may be set for a sub-band that is used for a relatively long time.

In addition, the terminal device may further send indication information about whether to use at least part of sub-bands where interference exists or not to the network side.

The terminal device, for example, the UE, analyzes whether internal interference exists in different sub-bands on an NR carrier or not according to a carrier and bandwidth of the NR cell and a carrier and bandwidth of the LTE cell jointly working with the NR, and then the terminal device reports specific sub-bands where no internal interference exists as well as usage priorities for the terminal device, specific sub-bands where internal interference inevitably exists as well as expected usage priorities for the terminal device and specific sub-bands where weak internal interference exists as well as expected usage priorities for the terminal on the whole NR bandwidth, and an indication about whether to suggest the sub-bands where the weak interference exists to be used or not.

The terminal device may report sub-band information about whether internal interference exists in an NR sub-band or not in the following representation forms.

In a first manner, each sub-band in a carrier spectrum of the first cell is represented in form of a center frequency point and a bandwidth. That is, information of each sub-band in the NR carrier spectrum is represented according to a band and the bandwidth form.

In a second manner, each sub-band in the carrier spectrum of the first cell is represented according to a sub-band index identifier.

An index identifier setting manner may be as follows: the carrier spectrum of the first cell is divided to obtain at least one spectrum block, and an index identifier is set for each spectrum block based on a frequency corresponding to the at least one spectrum block.

That is, the terminal device equally divides the carrier spectrum of the whole NR cell according to a certain bandwidth and then indexes the spectrum block to be for example, 1, 2, and 3, according to a sequence from low to high frequencies. Correspondingly, the terminal device reports an internal interference condition of the NR carrier spectrum according to an index of the spectrum block and identifies each spectrum block with priority information about usage of the spectrum block by the terminal device.

In a third manner, each sub-band in the carrier spectrum of the first cell is represented in form of a frequency point starting position and the bandwidth. That is, the information of each sub-band in the NR carrier spectrum is represented according to the frequency point starting position and the bandwidth form.

It is also to be pointed out that each base station (an LTE base station or an NR base station), after receiving internal interference auxiliary information reported by the terminal device, forwards it to the other base station.

The NR base station, when commanding the terminal device to use a Bandwidth Part (BWP) (i.e., a sub-band), may preferably specify the BWP on a sub-band with a high priority for the terminal device.

A processing manner for the terminal device in the scenario of dual connectivity with NR and LTE cells is presented in the abovementioned solution. A processing manner for the terminal device when a cell of an LTE system adopts a Carrier Aggregation (CA) configuration will be described below.

When the internal interference level during simultaneous data transmission and reception in the at least one sub-band on the carrier of the first cell and the second cell is detected, the method further includes the following operation.

For each of at least one second cell adopting the CA configuration, an internal interference level during simultaneous data transmission and reception through the at least one sub-band on the carrier of the first cell and the second cell is detected.

In this scenario, the following operations may further be included: a corresponding usage priority is determined based on the internal interference level during simultaneous data transmission and reception in the at least one sub-band on the carrier of the first cell and each second cell; and furthermore, the internal interference level during simultaneous data transmission and reception in the at least one sub-band on the carrier of the first cell and each second cell and the corresponding usage priority are reported to the network side.

Specifically, if a cell of an LTE side adopts the CA configuration, for each serving cell in LTE CA, the terminal device reports an interference level distribution between spectrums of the cell and the NR carrier cell according to the abovementioned solution. Each base station (the LTE base station or the NR base station), after receiving the internal interference auxiliary information reported by the terminal device, forwards it to the other base station.

For avoiding the internal interference of the terminal device and simultaneously improving utilization efficiency of the NR carrier spectrum, LTE sets and transmits a pattern for scheduling of each LTE serving cell to NR; and NR selects a proper BWP for the terminal device according to the pattern for scheduling of the LTE cells and the internal interference condition, identified by the terminal device, of each cell in an LTE CA cell list and a BWP in the NR cell.

Alternatively, simultaneous data transmission and reception of problematic BWPs and LTE cells is avoided by reasonable scheduling.

It may be seen that, through the solution, the terminal device in the dual-connectivity mode reports the corresponding internal interference level during simultaneous data transmission and reception in the first cell and the second cell and usage priority information of a certain spectrum for the terminal device to the network side, and the network side may further select a proper sub-band for the terminal device with reference to the information reported by the terminal device during dynamic sub-band allocation. Therefore, effects of avoiding self-interference in a scenario that data is simultaneously transmitted and received in two cells and improving data demodulation performance may be achieved, and data transmission reliability and throughput may further be improved.

Second Embodiment

Figure 2:
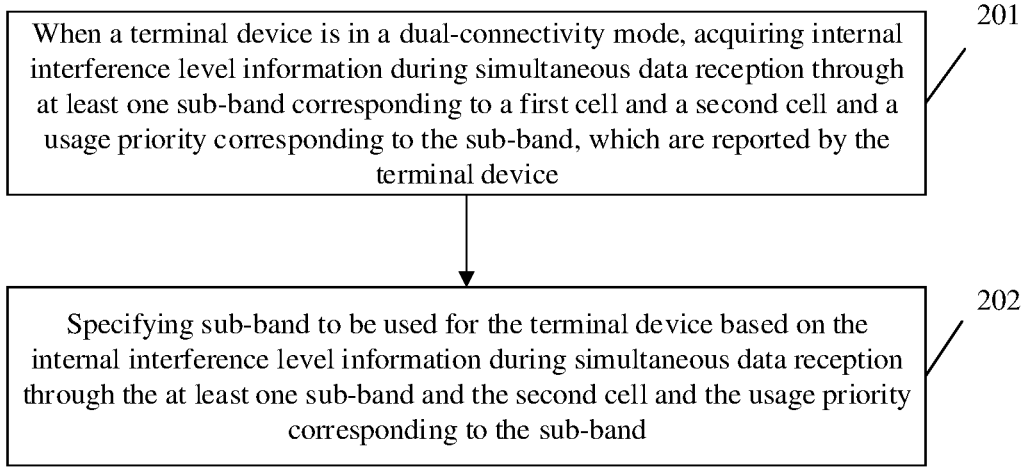
FIG. 2 is a second flowchart of a method for interference processing according to an embodiment of the disclosure.

The embodiment of the disclosure provides a method for interference processing, which is applied to a first network device and, as shown in FIG. 2, includes the following steps.

At 201, when a terminal device is in a dual-connectivity mode, internal interference level information during simultaneous data reception through at least one sub-band corresponding to a first cell and a second cell and a usage priority corresponding to the sub-band, which are reported by the terminal device, are acquired, the terminal device in the dual-connectivity mode being capable of establishing connections with the first cell and the second cell.

At 202, a sub-band to be used is specified for the terminal device based on the internal interference level information during simultaneous data reception through the at least one sub-band and the second cell and the usage priority corresponding to the sub-band.

The terminal device of the embodiment of the disclosure may be a mobile terminal capable of implementing dual connectivity, and for example, may be a device like a smart phone, UE (terminal device), a tablet computer, etc. Exhaustions are omitted herein.

The dual-connectivity mode may refer to that the terminal device, for example, UE, is configured by the network side to enter an EN-DC mode. The EN-DC mode may refer to that the terminal device implements dual connectivity with an LTE cell and an NR cell.

The first cell may be an NR cell, and the second cell may be an LTE cell.

Furthermore, simultaneous data transmission and reception in the first cell and the second cell may refer to that data is sent in the first cell (the NR cell) and data is simultaneously received in the second cell (the LTE cell).

The internal interference level includes at least one of the indication about whether the internal interference exists or not and the interval interference grade. That is, the internal interference indication about whether interference exists in each sub-band of the at least one sub-band in the first cell or not may be indicated.

For whether the interference exists or not, there may exist the condition that the interference exists in the sub-band, no interference exists or relatively weak interference exists. Existence of the relatively weak interference refers to a condition that an interference value is less than a preset interference threshold value, and the preset interference threshold value may be set according to a practical condition. Of course, the relatively weak interference may also refer to a condition that a signal-to-noise ratio is less than a preset threshold value or a condition that signal strength is greater than a preset threshold value. Exhaustions are omitted herein.

In addition, the internal interference level may also be represented as the internal interference grade. For example, an internal interference grade of a sub-band where no interference exists may be 0, and an internal interference level of a sub-band where interference exists (i.e., a sub-band of which a signal-to-noise ratio is less than a minimum signal-to-noise ratio threshold value or an interference value is greater than a maximum interference threshold value) may be set to be 5. Then, an internal interference grade corresponding to another interference value may also be set according to another grade threshold value.

For determination of the usage priority of the sub-band, the usage priority of the sub-band may be determined according to the internal interference level during simultaneous data transmission and reception through the sub-band and the second cell. It may be set by the terminal device according to a practical requirement. For example, a relatively high priority may be set for a sub-band with a relatively low interference value (i.e., relatively low internal interference level), or a relatively high priority may be set for a sub-band that is used for a relatively long time.

In addition, the terminal device may further send indication information about whether to use at least part of sub-bands where interference exists or not to the network side.

The terminal device, for example, the UE, analyzes whether internal interference exists in different sub-bands on an NR carrier or not according to a carrier and bandwidth of the NR cell and a carrier and bandwidth of the LTE cell jointly working with the NR, and then the terminal device reports specific sub-bands where no internal interference exists as well as usage priorities for the terminal device, specific sub-bands where internal interference inevitably exists as well as expected usage priorities for the terminal device and specific sub-bands where weak internal interference exists as well as expected usage priorities for the terminal on the whole NR bandwidth, and an indication about whether to suggest the sub-bands where the weak interference exists to be used or not.

The terminal device may report sub-band information about whether internal interference exists in an NR sub-band or not in the following representation forms.

In a first manner, each sub-band in a carrier spectrum of the first cell is represented in form of a center frequency point and a bandwidth. That is, information of each sub-band in the NR carrier spectrum is represented according to a band and the bandwidth form.

In a second manner, each sub-band in the carrier spectrum of the first cell is represented according to a sub-band index identifier.

An index identifier setting manner may be as follows: the carrier spectrum of the first cell is divided to obtain at least one spectrum block, and an index identifier is set for each spectrum block based on a frequency corresponding to the at least one spectrum block.

That is, the terminal device equally divides the carrier spectrum of the whole NR cell according to a certain bandwidth and then indexes the spectrum block to be for example, 1, 2, and 3, according to a sequence from low to high frequencies. Correspondingly, the terminal device reports an internal interference condition of the NR carrier spectrum according to an index of the spectrum block and identifies each spectrum block with priority information about usage of the spectrum block by the terminal device.

In a third manner, each sub-band in the carrier spectrum of the first cell is represented in form of a frequency point starting position and the bandwidth. That is, the information of each sub-band in the NR carrier spectrum is represented according to the frequency point starting position and the bandwidth form.

It is also to be pointed out that each base station (an LTE base station or an NR base station), after receiving internal interference auxiliary information reported by the terminal device, forwards it to the other base station. Specifically, the following processing may be included.

In a first manner, the received internal interference level information during simultaneous data transmission and reception in the at least one sub-band corresponding to the first cell and the second cell and usage priority corresponding to the sub-band are sent to a second network device managing the second cell.

In the processing, the first cell may be an NR cell, and the first network device may be a network device capable of processing the NR cell; and correspondingly, the second cell may be an LTE cell, and the second network device is a network device managing a cell in an LTE network. The first network device and the second network device may be base stations, and moreover, the first network device and the second network device are different entities, namely they may be two different base stations managing the LTE cell and the NR cell respectively.

In a second manner, the internal interference level information during simultaneous data transmission and reception in the at least one sub-band corresponding to the first cell and the second cell and usage priority corresponding to the sub-band, which are reported by the terminal device, are acquired from the second network device.

In the two manners, one is that the NR cell (the first cell) receives the internal interference level information and usage priority corresponding to the sub-band, which are reported to the terminal device, and then sends the information to the second network device for the second cell; and the other is that the second cell (for example, the LTE cell) receives the internal interference level information and the usage priority corresponding to the sub-band, which are reported by the terminal device, at first and then sends the information to the first network device for the first network device to use when processing an interference coordination condition of the first cell.

The operation that a BWP is specified for the terminal device based on an internal interference condition of the at least one sub-band includes the following operations.

A target sub-band is selected for the terminal device based on the usage priority corresponding to the sub-band.

The target sub-band is specified to the terminal device.

For example, the base station of the NR cell (i.e., the first network device for the first cell), when commanding the terminal device to use a BWP (i.e., a sub-band), may preferably specify the BWP on a sub-band with a high priority for the terminal device.

A processing manner for the terminal device in the scenario of dual connectivity with NR and LTE cells is presented in the abovementioned solution. A processing manner for the terminal device when a cell of an LTE system adopts a CA configuration will be described below.

The method further includes the following operation.

An internal interference level corresponding to each second cell in a CA mode and a corresponding usage priority are received from the terminal device.

In this scenario, the following operation may further be included: pattern information for scheduling of at least one second cell in the CA mode is acquired from the second network device. Correspondingly, the target sub-band is selected for the terminal device based on the pattern information for scheduling of the at least one second cell, the internal interference level, identified by the terminal device, between each second cell in the at least one second cell and the first cell and the corresponding usage priority.

Specifically, if a cell of an LTE side adopts the CA configuration, for each serving cell in LTE CA, the terminal device reports an interference level distribution between spectrums of the cell and the NR carrier cell according to the abovementioned solution. Each base station (the LTE base station or the NR base station), after receiving the internal interference auxiliary information reported by the terminal device, forwards it to the other base station.

For avoiding the internal interference of the terminal device and simultaneously improving utilization efficiency of the NR carrier spectrum, LTE sets and transmits a pattern for scheduling of each LTE serving cell to NR; and NR selects a proper BWP for the terminal device according to the pattern for scheduling of the LTE cells and the internal interference condition, identified by the terminal device, of each cell in an LTE CA cell list and a BWP in the NR cell.

Alternatively, simultaneous data transmission and reception of problematic BWPs and LTE cells is avoided by reasonable scheduling.

A pattern for scheduling of each LTE serving cell is configured for each LTE serving cell, and the pattern information for scheduling of the at least one second cell in the CA mode includes:

period information, a timing offset, a bitmap corresponding to the scheduling pattern information.

For example, the pattern includes a piece of period information, a timing offset and a scheduling pattern bitmap.

The bitmap corresponding to the scheduling pattern information is used to indicate whether the second cell is scheduled in a time unit corresponding to the bitmap.

The time unit is at least one of: a subframe, a slot or a symbol.

That is, each bit represents a time unit, and the time unit may be a subframe or a slot or a symbol. When the corresponding bit is set to be 1, it is indicated that the present serving cell is scheduled, otherwise is not scheduled. (Or on the contrary, when the corresponding bit is set to be 0, it is indicated that the present serving cell is scheduled, otherwise is not scheduled.)

It may be seen that, through the solution, the terminal device in the dual-connectivity mode reports the corresponding internal interference level during simultaneous data transmission and reception in the first cell and the second cell and usage priority information of a certain spectrum for the terminal device to the network side, and the network side may further select a proper sub-band for the terminal device with reference to the information reported by the terminal device during dynamic sub-band allocation. Therefore, effects of avoiding self-interference in a scenario that data is simultaneously transmitted and received in two cells and improving data demodulation performance may be achieved, and data transmission reliability and throughput may further be improved.

Third Embodiment

Figure 3:
FIG. 3 is a diagram illustrating configuration of a terminal device according to an embodiment of the disclosure.

The embodiment of the disclosure provides a terminal device, which, as shown in FIG. 3, includes a first processing unit 31 and a first communication unit 32.

The first processing unit 31, when the terminal device is in a dual-connectivity mode, detects an internal interference level during simultaneous data transmission and reception through at least one sub-band on a carrier of a first cell and a second cell and determines a usage priority of the sub-band according to the internal interference level during simultaneous data transmission and reception through the sub-band and the second cell, the terminal device in the dual-connectivity mode being capable of establishing connections with the first cell and the second cell.

The first communication unit 32 reports the sub-band and the corresponding internal interference level and usage priority to a network side, the internal interference level including at least one of an indication about whether internal interference exists or an interval interference grade.

The terminal device of the embodiment of the disclosure may be a mobile terminal capable of implementing dual connectivity, and for example, may be a device like a smart phone, UE (terminal device), a tablet computer, etc. Exhaustions are omitted herein.

The dual-connectivity mode may refer to that the terminal device, for example, UE, is configured by the network side to enter an EN-DC mode. The EN-DC mode may refer to that the terminal device implements dual connectivity with an LTE cell and an NR cell.

The first cell may be an NR cell, and the second cell may be an LTE cell.

Furthermore, simultaneous data transmission and reception in the first cell and the second cell may refer to that data is sent in the first cell (the NR cell) and data is simultaneously received in the second cell (the LTE cell).

The operation that the first processing unit 31 detects the internal interference level during simultaneous data transmission and reception in the at least one sub-band on the carrier of the first cell and the second cell may refer to that the terminal device detects an interference condition for a band corresponding to the second cell during data transmission in the first cell. The internal interference level includes at least one of the indication about whether the internal interference exists or not and the interval interference grade. That is, the internal interference indication about whether interference exists in each sub-band of the at least one sub-band in the first cell or not may be indicated.

For whether the interference exists or not, there may exist the condition that the interference exists in the sub-band, no interference exists or relatively weak interference exists. Existence of the relatively weak interference refers to a condition that an interference value is less than a preset interference threshold value, and the preset interference threshold value may be set according to a practical condition. Of course, the relatively weak interference may also refer to a condition that a signal-to-noise ratio is less than a preset threshold value or a condition that signal strength is greater than a preset threshold value. Exhaustions are omitted herein.

In addition, the internal interference level may also be represented as the internal interference grade. For example, an internal interference grade of a sub-band where no interference exists may be 0, and an internal interference level of a sub-band where interference exists (i.e., a sub-band of which a signal-to-noise ratio is less than a minimum signal-to-noise ratio threshold value or an interference value is greater than a maximum interference threshold value) may be set to be 5. Then, an internal interference grade corresponding to another interference value may also be set according to another grade threshold value.

For determination of the usage priority of the sub-band, the first processing unit 31 determines the usage priority of the sub-band according to the internal interference level during simultaneous data transmission and reception through the sub-band and the second cell. It may be set by the terminal device according to a practical requirement. For example, a relatively high priority may be set for a sub-band with a relatively low interference value (i.e., relatively low internal interference level), or a relatively high priority may be set for a sub-band that is used for a relatively long time.

In addition, the terminal device may further send indication information about whether to use at least part of sub-bands where interference exists or not to the network side.

The first processing unit 31 analyzes whether internal interference exists in different sub-bands on an NR carrier or not according to a carrier and bandwidth of the NR cell and a carrier and bandwidth of the LTE cell jointly working with the NR, and then the terminal device reports specific sub-bands where no internal interference exists as well as usage priorities for the terminal device, specific sub-bands where internal interference inevitably exists as well as expected usage priorities for the terminal device and specific sub-bands where weak internal interference exists as well as expected usage priorities for the terminal on the whole NR bandwidth, and an indication about whether to suggest the sub-bands where the weak interference exists to be used or not.

The first processing unit 31 reports sub-band information about whether internal interference exists in an NR sub-band or not in the following representation forms.

In a first manner, each sub-band in a carrier spectrum of the first cell is represented in form of a center frequency point and a bandwidth. That is, information of each sub-band in the NR carrier spectrum is represented according to a band and the bandwidth form.

In a second manner, each sub-band in the carrier spectrum of the first cell is represented according to a sub-band index identifier.

An index identifier setting manner may be as follows: the carrier spectrum of the first cell is divided to obtain at least one spectrum block, and an index identifier is set for each spectrum block based on a frequency corresponding to the at least one spectrum block.

That is, the terminal device equally divides the carrier spectrum of the whole NR cell according to a certain bandwidth and then indexes the spectrum block to be for example, 1, 2, and 3, according to a sequence from low to high frequencies. Correspondingly, the terminal device reports an internal interference condition of the NR carrier spectrum according to an index of the spectrum block and identifies each spectrum block with priority information about usage of the spectrum block by the terminal device.

In a third manner, each sub-band in the carrier spectrum of the first cell is represented in form of a frequency point starting position and the bandwidth. That is, the information of each sub-band in the NR carrier spectrum is represented according to the frequency point starting position and the bandwidth form.

It is also to be pointed out that each base station (an LTE base station or an NR base station), after receiving internal interference auxiliary information reported by the terminal device, forwards it to the other base station.

The NR base station, when commanding the terminal device to use a Bandwidth Part (BWP) (i.e., a sub-band), may preferably specify the BWP on a sub-band with a high priority for the terminal device.

A processing manner for the terminal device in the scenario of dual connectivity with NR and LTE cells is presented in the abovementioned solution. A processing manner for the terminal device when a cell of an LTE system adopts a CA configuration will be described below.

The first processing unit 31, for each of at least one second cell adopting the CA configuration, detects an internal interference level during simultaneous data transmission and reception through the at least one sub-band on the carrier of the first cell and the second cell.

In this scenario, the following operations may further be included: the first processing unit 31 determines a corresponding usage priority based on the internal interference level during simultaneous data transmission and reception in the at least one sub-band on the carrier of the first cell and each second cell; and furthermore, the internal interference level during simultaneous data transmission and reception in the at least one sub-band on the carrier of the first cell and each second cell and the corresponding usage priority are reported to the network side.

Specifically, if a cell of an LTE side adopts the CA configuration, for each serving cell in LTE CA, the terminal device reports an interference level distribution between spectrums of the cell and the NR carrier cell according to the abovementioned solution. Each base station (the LTE base station or the NR base station), after receiving the internal interference auxiliary information reported by the terminal device, forwards it to the other base station.

For avoiding the internal interference of the terminal device and simultaneously improving utilization efficiency of the NR carrier spectrum, LTE sets and transmits a pattern for scheduling of each LTE serving cell to NR; and NR selects a proper BWP for the terminal device according to the pattern for scheduling of the LTE cells and the internal interference condition, identified by the terminal device, of each cell in an LTE CA cell list and a BWP in the NR cell.

Alternatively, simultaneous data transmission and reception of problematic BWPs and LTE cells is avoided by reasonable scheduling.

It may be seen that, through the solution, the terminal device in the dual-connectivity mode reports the corresponding internal interference level during simultaneous data transmission and reception in the first cell and the second cell and usage priority information of a certain spectrum for the terminal device to the network side, and the network side may further select a proper sub-band for the terminal device with reference to the information reported by the terminal device during dynamic sub-band allocation. Therefore, effects of avoiding self-interference in a scenario that data is simultaneously transmitted and received in two cells and improving data demodulation performance may be achieved, and data transmission reliability and throughput may further be improved.

Fourth Embodiment

Figure 4:
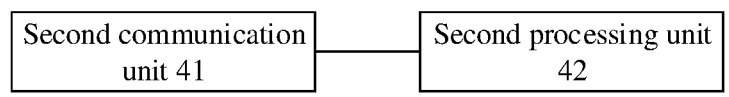
FIG. 4 is a diagram illustrating configuration of a first network device according to an embodiment of the disclosure.

The embodiment of the disclosure provides a first network device, which, as shown in FIG. 4, includes a second communication unit 41 and a second processing unit 42.

The second communication unit 41, when a terminal device is in a dual-connectivity mode, acquires internal interference level information during simultaneous data reception through at least one sub-band corresponding to a first cell and a second cell and a usage priority corresponding to the sub-band, which are reported by the terminal device, the terminal device in the dual-connectivity mode being capable of establishing connections with the first cell and the second cell.

The second processing unit 42 specifies a sub-band to be used for the terminal device based on the internal interference level information during simultaneous data reception through the at least one sub-band and the second cell and the usage priority corresponding to the sub-band.

The terminal device of the embodiment of the disclosure may be a mobile terminal capable of implementing dual connectivity, and for example, may be a device like a smart phone, UE (terminal device), a tablet computer, etc. Exhaustions are omitted herein.

The dual-connectivity mode may refer to that the terminal device, for example, UE, is configured by the network side to enter an EN-DC mode. The EN-DC mode may refer to that the terminal device implements dual connectivity with an LTE cell and an NR cell.

The first cell may be an NR cell, and the second cell may be an LTE cell.

Furthermore, simultaneous data transmission and reception in the first cell and the second cell may refer to that data is sent in the first cell (the NR cell) and data is simultaneously received in the second cell (the LTE cell).

The internal interference level includes at least one of the indication about whether the internal interference exists or not and the interval interference grade. That is, the internal interference indication about whether interference exists in each sub-band of the at least one sub-band in the first cell or not may be indicated.

For whether the interference exists or not, there may exist the condition that the interference exists in the sub-band, no interference exists or relatively weak interference exists. Existence of the relatively weak interference refers to a condition that an interference value is less than a preset interference threshold value, and the preset interference threshold value may be set according to a practical condition. Of course, the relatively weak interference may also refer to a condition that a signal-to-noise ratio is less than a preset threshold value or a condition that signal strength is greater than a preset threshold value. Exhaustions are omitted herein.

In addition, the internal interference level may also be represented as the internal interference grade. For example, an internal interference grade of a sub-band where no interference exists may be 0, and an internal interference level of a sub-band where interference exists (i.e., a sub-band of which a signal-to-noise ratio is less than a minimum signal-to-noise ratio threshold value or an interference value is greater than a maximum interference threshold value) may be set to be 5. Then, an internal interference grade corresponding to another interference value may also be set according to another grade threshold value.

For determination of the usage priority of the sub-band, the usage priority of the sub-band may be determined according to the internal interference level during simultaneous data transmission and reception through the sub-band and the second cell. It may be set by the terminal device according to a practical requirement. For example, a relatively high priority may be set for a sub-band with a relatively low interference value (i.e., relatively low internal interference level), or a relatively high priority may be set for a sub-band that is used for a relatively long time.

In addition, the terminal device may further send indication information about whether to use at least part of sub-bands where interference exists or not to the network side.

The terminal device, for example, the UE, analyzes whether internal interference exists in different sub-bands on an NR carrier or not according to a carrier and bandwidth of the NR cell and a carrier and bandwidth of the LTE cell jointly working with the NR, and then the terminal device reports specific sub-bands where no internal interference exists as well as usage priorities for the terminal device, specific sub-bands where internal interference inevitably exists as well as expected usage priorities for the terminal device and specific sub-bands where weak internal interference exists as well as expected usage priorities for the terminal on the whole NR bandwidth, and an indication about whether to suggest the sub-bands where the weak interference exists to be used or not.

The terminal device may report sub-band information about whether internal interference exists in an NR sub-band or not in the following representation forms.

In a first manner, each sub-band in a carrier spectrum of the first cell is represented in form of a center frequency point and a bandwidth. That is, information of each sub-band in the NR carrier spectrum is represented according to a band and the bandwidth form.

In a second manner, each sub-band in the carrier spectrum of the first cell is represented according to a sub-band index identifier.

An index identifier setting manner may be as follows: the carrier spectrum of the first cell is divided to obtain at least one spectrum block, and an index identifier is set for each spectrum block based on a frequency corresponding to the at least one spectrum block.

That is, the terminal device equally divides the carrier spectrum of the whole NR cell according to a certain bandwidth and then indexes the spectrum block to be for example, 1, 2, and 3, according to a sequence from low to high frequencies. Correspondingly, the terminal device reports an internal interference condition of the NR carrier spectrum according to an index of the spectrum block and identifies each spectrum block with priority information about usage of the spectrum block by the terminal device.

In a third manner, each sub-band in the carrier spectrum of the first cell is represented in form of a frequency point starting position and the bandwidth. That is, the information of each sub-band in the NR carrier spectrum is represented according to the frequency point starting position and the bandwidth form.

It is also to be pointed out that each base station (an LTE base station or an NR base station), after receiving internal interference auxiliary information reported by the terminal device, forwards it to the other base station. Specifically, the following processing may be included.

In a first manner the second communication unit 41 send the received internal interference level information during simultaneous data transmission and reception in the at least one sub-band corresponding to the first cell and the second cell and usage priority corresponding to the sub-band to a second network device managing the second cell.

In the processing, the first cell may be an NR cell, and the first network device may be a network device capable of processing the NR cell; and correspondingly, the second cell may be an LTE cell, and the second network device is a network device managing a cell in an LTE network. The first network device and the second network device may be base stations, and moreover, the first network device and the second network device are different entities, namely they may be two different base stations managing the LTE cell and the NR cell respectively.

In a second manner, the second communication unit 41 acquires the internal interference level information during simultaneous data transmission and reception in the at least one sub-band corresponding to the first cell and the second cell and usage priority corresponding to the sub-band, which are reported by the terminal device, from the second network device.

In the two manners, one is that the NR cell (the first cell) receives the internal interference level information and usage priority corresponding to the sub-band, which are reported to the terminal device, and then sends the information to the second network device for the second cell; and the other is that the second cell (for example, the LTE cell) receives the internal interference level information and the usage priority corresponding to the sub-band, which are reported by the terminal device, at first and then sends the information to the first network device for the first network device to use when processing an interference coordination condition of the first cell.

The second processing unit selects a target sub-band for the terminal device based on the usage priority corresponding to the sub-band and
specifies the target sub-band to the terminal device.

For example, the base station of the NR cell (i.e., the first network device for the first cell), when commanding the terminal device to use a BWP (i.e., a sub-band), may preferably specify the BWP on a sub-band with a high priority for the terminal device.

A processing manner for the terminal device in the scenario of dual connectivity with NR and LTE cells is presented in the abovementioned solution. A processing manner for the terminal device when a cell of an LTE system adopts a CA configuration will be described below.

The second communication unit receives an internal interference level corresponding to each second cell in a CA mode and a corresponding usage priority from the terminal device.

In this scenario, the second communication unit acquires pattern information for scheduling of at least one second cell in the CA mode from the second network device. Correspondingly, the second processing unit selects the target sub-band for the terminal device based on the pattern information for scheduling of the at least one second cell, the internal interference level, identified by the terminal device, between each second cell in the at least one second cell and the first cell and the corresponding usage priority.

Specifically, if a cell of an LTE side adopts the CA configuration, for each serving cell in LTE CA, the terminal device reports an interference level distribution between spectrums of the cell and the NR carrier cell according to the abovementioned solution. Each base station (the LTE base station or the NR base station), after receiving the internal interference auxiliary information reported by the terminal device, forwards it to the other base station.

For avoiding the internal interference of the terminal device and simultaneously improving utilization efficiency of the NR carrier spectrum, LTE sets and transmits a pattern for scheduling of each LTE serving cell to NR; and NR selects a proper BWP for the terminal device according to the pattern for scheduling of the LTE cells and the internal interference condition, identified by the terminal device, of each cell in an LTE CA cell list and a BWP in the NR cell.

Or simultaneous data transmission and reception of problematic BWPs and LTE cells is avoided by reasonable scheduling.

A pattern for scheduling of each LTE serving cell is configured for each LTE serving cell, and the pattern information for scheduling of the at least one second cell in the CA mode includes:
period information, a timing offset, a bitmap corresponding to the scheduling pattern information.

For example, the pattern includes a piece of period information, a timing offset and a scheduling pattern bitmap.

The bitmap corresponding to the scheduling pattern information is used to indicate whether the second cell is scheduled in a time unit corresponding to the bitmap.

The time unit is at least one of: a subframe, a slot or a symbol.

That is, each bit represents a time unit, and the time unit may be a subframe or a slot or a symbol. When the corresponding bit is set to be 1, it is indicated that the present serving cell is scheduled, otherwise is not scheduled. (Or on the contrary, when the corresponding bit is set to be 0, it is indicated that the present serving cell is scheduled, otherwise is not scheduled.)

It may be seen that, through the solution, the terminal device in the dual-connectivity mode reports the corresponding internal interference level during simultaneous data transmission and reception in the first cell and the second cell and usage priority information of a certain spectrum for the terminal device to the network side, and the network side may further select a proper sub-band for the terminal device with reference to the information reported by the terminal device during dynamic sub-band allocation. Therefore, effects of avoiding self-interference in a scenario that data is simultaneously transmitted and received in two cells and improving data demodulation performance may be achieved, and data transmission reliability and throughput may further be improved.

Figure 5:
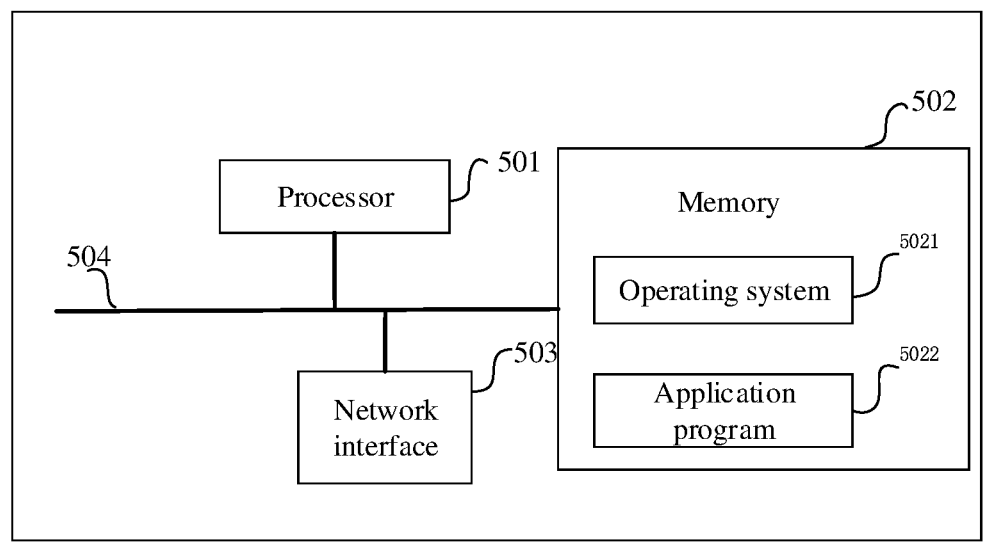
FIG. 5 is a schematic diagram of a hardware architecture according to an embodiment of the disclosure.

An embodiment of the disclosure also provides a hardware composition architecture of a terminal device or a network device, which, as shown in FIG. 5, includes at least one processor 501, a memory 502 and at least one network interface 503. Each component is coupled together through a bus system 504. It may be understood that the bus system 504 is configured to implement connection communication between these components. The bus system 504 includes a data bus and further includes a power bus, a control bus and a state signal bus. However, for clear description, various buses in FIG. 5 are marked as the bus system 504.

It may be understood that the memory 502 in the embodiment of the disclosure may be a volatile memory or a nonvolatile memory, or may include both the volatile and nonvolatile memories.

In some corresponding modes, the memory 502 stores the following elements, executable modules or data structures, or a subset thereof or an extended set thereof:
an operating system 5021 and an application program 5022.

The processor 501 is configured to be capable of executing all the steps of the method in embodiment 1 or embodiment 2, and elaborations are omitted herein.

An embodiment of the disclosure provides a computer storage medium, which stores a computer-executable instruction, that when being executed, implement the steps of the method in embodiment 1 or 2. Elaborations are omitted herein.

When being implemented in form of software functional module and sold or used as an independent product, the device of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Consequently, the embodiments of the disclosure are not limited to any specific hardware and software combination.

Correspondingly, the embodiments of the disclosure also provide a computer storage medium, in which a computer program is stored, the computer program being configured to execute the data scheduling method of the embodiments of the disclosure.

Although the preferred embodiments of the disclosure have been disclosed for the exemplary purposes, those skilled in the art may realize that it is also possible to make various improvements, additions and replacements. Therefore, the scope of the disclosure should not be limited to the abovementioned embodiments.

The invention claimed is:

1. A method for interference processing, applied to a terminal device and comprising:
when the terminal device is in a dual-connectivity mode, detecting an internal interference level during simultaneous data transmission and reception through at least one sub-band on a carrier of a first cell and a second cell, the terminal device in the dual-connectivity mode being capable of establishing connections with the first cell and the second cell;
determining a usage priority of the sub-band according to the internal interference level during simultaneous data transmission and reception through the sub-band and the second cell; and
reporting the sub-band and the corresponding internal interference level and usage priority to a network side, the internal interference level comprising an indication about whether internal interference exists and an interval interference grade.

2. The method of claim 1, further comprising:
representing each sub-band in a carrier spectrum of the first cell in form of a center frequency point and a bandwidth.

3. The method of claim 1, further comprising:
representing each sub-band in the carrier spectrum of the first cell according to a sub-band index identifier.

4. The method of claim 3, further comprising:
dividing the carrier spectrum of the first cell to obtain at least one spectrum block; and
setting an index identifier for each spectrum block based on a frequency corresponding to the at least one spectrum block.

5. The method of claim 1, further comprising:
representing each sub-band in the carrier spectrum of the first cell in form of a frequency point starting position and the bandwidth.

6. The method of claim 1, wherein detecting the internal interference level during simultaneous data transmission and reception in the at least one sub-band on the carrier of the first cell and the second cell comprises:
for each of at least one second cell adopting a Carrier Aggregation (CA) configuration, detecting an internal interference level during simultaneous data transmission and reception through the at least one sub-band on the carrier of the first cell and the second cell.

7. The method of claim 6, further comprising:
reporting the corresponding internal interference level during simultaneous data transmission and reception through the sub-band and each second cell and a corresponding usage priority to the network side.

8. A terminal device, comprising:
a processor configured to, when the terminal device is in a dual-connectivity mode, detect an internal interference level during simultaneous data transmission and reception through at least one sub-band on a carrier of a first cell and a second cell and determine a usage priority of the sub-band according to the internal interference level during simultaneous data transmission and reception through the sub-band and the second cell, the terminal device in the dual-connectivity mode being capable of establishing connections with the first cell and the second cell; and
a network interface configured to, report the sub-band and the corresponding internal interference level and usage priority to a network side, the internal interference level comprising an indication about whether internal interference exists and an interval interference grade.

9. The terminal device of claim 8, wherein the processor is configured to represent each sub-band in a carrier spectrum of the first cell in form of a center frequency point and a bandwidth.

10. The terminal device of claim 8, wherein the processor is configured to represent each sub-band in the carrier spectrum of the first cell according to a sub-band index identifier.

11. The terminal device of claim 10, wherein the processor is configured to:
divide the carrier spectrum of the first cell to obtain at least one spectrum block; and
set an index identifier for each spectrum block based on a frequency corresponding to the at least one spectrum block.

12. The terminal device of claim 8, wherein the processor is configured to represent each sub-band in the carrier spectrum of the first cell in form of a frequency point starting position and the bandwidth.

13. The terminal device of claim 8, wherein the processor is configured to: for each of at least one second cell adopting a Carrier Aggregation (CA) configuration, detect an internal interference level during simultaneous data transmission and reception through the at least one sub-band on the carrier of the first cell and the second cell.

14. The terminal device of claim 13, wherein the processor is configured to report the corresponding internal interference level during simultaneous data transmission and reception through the sub-band and each second cell and a corresponding usage priority to the network side.

15. A first network device, comprising:
a network interface configured to, when a terminal device is in a dual-connectivity mode, acquire internal interference level information during simultaneous data reception through at least one sub-band corresponding to a first cell and a second cell and a usage priority corresponding to the sub-band, which are reported by the terminal device, the terminal device in the dual-connectivity mode being capable of establishing connections with the first cell and the second cell; and
a processor configured to, specify a sub-band to be used for the terminal device based on the internal interference level information during simultaneous data reception through the at least one sub-band and the second cell and the usage priority corresponding to the sub-band, the internal interference level information comprising an indication about whether internal interference exists and an interval interference grade.

16. The first network device of claim 15, wherein the network interface is configured to:
send the received internal interference level information during simultaneous data reception through the at least one sub-band corresponding to the first cell and the second cell and usage priority corresponding to the sub-band to a second network device managing the second cell; or
acquire from the second network device the internal interference level information during simultaneous data reception in the at least one sub-band corresponding to the first cell and the second cell and usage priority corresponding to the sub-band, which are reported by the terminal device.

17. The first network device of claim 15, wherein the processor is configured to select a target sub-band for the terminal device based on the usage priority corresponding to the sub-band and specify the target sub-band to the terminal device.

18. The first network device of claim 15, wherein the network interface is configured to receives an internal interference level corresponding to each second cell in a Carrier Aggregation (CA) mode and a corresponding usage priority from the terminal device.

19. The first network device of claim 18, wherein the network interface is configured to acquire pattern information for scheduling of at least one second cell in the CA mode from the second network device.

20. The first network device of claim 3, wherein the processor is configured to select the target sub-band for the terminal device based on: pattern information for scheduling of the at least one second cell; the internal interference level, identified by the terminal device, between each second cell in the at least one second cell and the first cell; and the corresponding usage priority.

* * * * *